(12) United States Patent
Wada et al.

(10) Patent No.: US 11,750,125 B2
(45) Date of Patent: Sep. 5, 2023

(54) MOTOR DRIVE CONTROL DEVICE, MOTOR UNIT, AND MOTOR DRIVE CONTROL METHOD

(71) Applicant: MINEBEA MITSUMI Inc., Nagano (JP)

(72) Inventors: Naoyuki Wada, Iwata (JP); Atsushi Kikuchi, Oamishirasato (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/664,251

(22) Filed: May 20, 2022

(65) Prior Publication Data
US 2022/0385216 A1    Dec. 1, 2022

(30) Foreign Application Priority Data

May 27, 2021  (JP) ................................ 2021-089435

(51) Int. Cl.
*H02P 8/34*    (2006.01)

(52) U.S. Cl.
CPC ..................... *H02P 8/34* (2013.01)

(58) Field of Classification Search
CPC ...... H02P 6/18; H02P 6/06; H02P 8/34; H02P 6/14; H02K 29/12; H02K 21/24; G04C 3/16; H01R 39/46
See application file for complete search history.

(56) References Cited

U.S. PATENT DOCUMENTS 5,491,397 A  *  2/1996  Hirakawa ................. H02P 8/36
                                                   318/696

FOREIGN PATENT DOCUMENTS

JP          2010-093914 A    4/2010

* cited by examiner

*Primary Examiner* — Said Bouziane
(74) *Attorney, Agent, or Firm* — Pearne & Gordon LLP

(57) ABSTRACT

A motor drive control device includes a control unit generating a control signal Sd such that one-phase excitation of exciting, of coils and of two phases of a two-phase stepping motor, a coil for one phase and two-phase excitation of exciting the coils for two phases are alternately repeated, and a drive unit driving the coils of two phases based on the control signal Sd. An energization angle θ representing a magnitude of an electric angle for continuously energizing the coil of one phase in one direction is capable of being set in the control unit. Specifically, the control unit determines a period T1$n$ for performing the one-phase excitation based on a back electromotive voltage generated in the coil non-excited in the one-phase excitation, and determines a period T2$n$ for performing the two-phase excitation based on an elapsed time per unit angle while the two-phase stepping motor is being excited and the energization angle θ.

11 Claims, 8 Drawing Sheets

MOTOR DRIVE CONTROL DEVICE, MOTOR UNIT, AND MOTOR DRIVE CONTROL METHOD

CROSS-REFERENCE TO RELATED APPLICATIONS

This application claims the benefit of priority to Japanese Application No. JP2021-089435, filed May 27, 2021, the entire disclosure of which is hereby incorporated herein by reference.

TECHNICAL FIELD

The present invention relates to a motor drive control device, a motor unit, and a motor drive control method, and for example, relates to a motor drive control device for driving a stepping motor.

BACKGROUND ART

As a stepping motor, a two-phase stepping motor having two phases is known.

As drive systems of the two-phase stepping motors, a one-phase excitation system, a two-phase excitation system, and a one-two-phase excitation system are known.

The one-phase excitation system is a system of switching a phase to be excited for each single phase. In the one-phase excitation system, an energization angle representing a magnitude of an electric angle for continuously energizing a one-phase coil in one direction is 90 degrees, and a two-phase stepping motor is commutated at every 90 degrees.

The two-phase excitation system is a system of switching phases to be excited for each two phases. In the two-phase excitation system, an energization angle is 180 degrees, and a two-phase stepping motor is commutated at every 90 degrees.

The one-two-phase excitation system is a system for switching phases to be excited by alternately switching one-phase excitation and two-phase excitation. In the one-two-phase excitation system, an energization angle is typically 135 degrees, and a two-phase stepping motor is commutated at every 45 degrees.

For example, Patent Document 1 discloses a motor drive control technique for providing, in a one-phase excitation period, a period for performing two-phase excitation of the same phases as phases in a next two-phase excitation period in order to suppress fluctuation in rotational speed of a two-phase stepping motor when the two-phase stepping motor is driven by the one-two-phase excitation system.

CITATION LIST

Patent Literature

Patent Document 1: JP 2010-93914 A

SUMMARY OF INVENTION

Technical Problem

As a method of controlling the drive of a two-phase stepping motor to be adopted in a predetermined application, the present inventors have studied a control method of changing a rotational speed of the two-phase stepping motor according to a load by using a one-two-phase excitation system generating torque larger than torque generated by one-phase excitation. Specifically, the control method is a closed-loop control method of generating appropriate torque for a load by detecting a point of a back electromotive voltage of a non-excited coil becoming zero (zero crossing point) in a one-phase excitation period, identifying a position of a rotor of the two-phase stepping motor, and determining a commutation timing based on the identified position of the rotor.

In the above-mentioned control method studied by the present inventors, it is necessary to detect a zero crossing point of the back electromotive voltage generated in the non-excited coil, and the zero crossing point of the back electromotive voltage can be only detected in a period of the one-phase excitation. However, in a case of the typical one-two-phase excitation system with an energization angle of 135 degrees, a two-phase stepping motor is commutated at every 45 degrees, and thus a period of one-phase excitation is shorter than in the one-phase excitation system, and there is a possibility that sufficient time cannot be secured for detection of the zero crossing point of the back electromotive voltage. Hereinafter, this problem will be described in detail with reference to a figure.

FIG. 8 is a diagram for describing energization switching control of a two-phase stepping motor by the conventional one-two-phase excitation system with an energization angle fixed to 135°.

In this diagram, a reference sign of 801 represents a voltage of an A-phase coil, and a reference sign of 802 represents a back electromotive voltage of the A-phase coil.

As illustrated in FIG. 8, in the one-two-phase excitation system, one-phase excitation and two-phase excitation are alternately repeated, so that an energizing state of the two-phase stepping motor is switched. For example, in FIG. 8, in a period of an electric angle from 180° to 225°, a negative drive voltage (−V) is applied to the A-phase coil to negatively excite the A-phase coil and a negative drive voltage (−V) is applied to a B-phase coil to negatively excite the B-phase coil. In the next period from 225° to 270°, the negative drive voltage (−V) is continuously applied to the B-phase coil to negatively excite the B-phase coil, while the drive voltage of the A-phase coil is set to "0" and the A-phase coil is not excited. Then, in a period from 270° to 315°, a positive drive voltage is applied to the A-phase coil to positively excite the A-phase coil, and the negative drive voltage is continuously applied to the B-phase coil to negatively excite the B-phase coil.

As described above, in the typical conventional one-two-phase excitation system, an energization angle representing a magnitude of an electric angle for continuously energizing a coil of one phase in one direction is 135°, and the one-phase excitation and the two-phase excitation are alternately switched at every 45°.

As described above, in the one-two-phase excitation system, a back electromotive voltage of the A-phase or B-phase coil can be detected only in a period when no drive voltage is applied to the coil. For example, as illustrated in FIG. 8, in a period of an electric angle from 180° to 225°, a negative drive voltage is applied to the A-phase coil, and thus, a back electromotive voltage at the A phase cannot be detected. On the other hand, in a period of an electric angle from 225° to 270°, a drive voltage is not applied to the A-phase coil, and thus, a back electromotive voltage at A phase can be detected. In this manner, in the one-two-phase excitation system, a zero crossing point of a back electromotive voltage can be detected only in a period of the one-phase excitation.

However, when the conventional one-two-phase excitation system with the energization angle fixed to 135° is employed in a drive control method studied by the inventors of the present application, there is a possibility that a zero crossing point of a back electromotive voltage cannot be detected within a period of the one-phase excitation.

For example, as illustrated in FIG. 8, in the period of the one-phase excitation for performing the one-phase excitation while an electric angle is from 225° to 270°, a spike-like voltage occurs at the non-excited A-phase coil immediately after switching from the two-phase excitation to the one-phase excitation. A time period until the spike-like voltage is stabilized depends on an inductance of the coil, a magnitude of a load, and the like.

Thus, under some conditions of the inductance of the coil, the magnitude of the load, and the like, it takes time to stabilize the back electromotive voltage generated in the non-excited coil after switching from the two-phase excitation to the one-phase excitation, as illustrated in FIG. 8, and thus there is a possibility that the zero crossing point of the back electromotive voltage cannot be detected within the period of the one-phase excitation and that stable energization switching cannot be performed.

The present invention has been made in view of the above-described problems, and an object of the present invention is to achieve stable energization switching of a two-phase stepping motor by a one-two-phase excitation system.

Solution to Problem

A motor drive control device according to a typical embodiment of the present invention includes a control unit generating a control signal for controlling driving of a two-phase stepping motor such that one-phase excitation of exciting, of coils of two phases of the two-phase stepping motor, a coil for one phase, and two-phase excitation of exciting, of the coils of two phases, the coils for two phases are alternately repeated, and a drive unit driving the coils of two phases based on the control signal, wherein an energization angle representing a magnitude of an electric angle for continuously energizing the coil of one phase in one direction is capable of being set in the control unit, and the control unit determines a period for performing the one-phase excitation based on a back electromotive voltage generated in the coil non-excited in the one-phase excitation, also determines a period for performing the two-phase excitation based on an elapsed time per unit angle while the two-phase stepping motor is being excited and the energization angle.

Advantageous Effects of Invention

The motor drive control device according to the present invention can achieve stable energization switching of the two-phase stepping motor by the one-two-phase excitation system.

DESCRIPTION OF EMBODIMENTS

1. Overview of Embodiment

Figure 1:
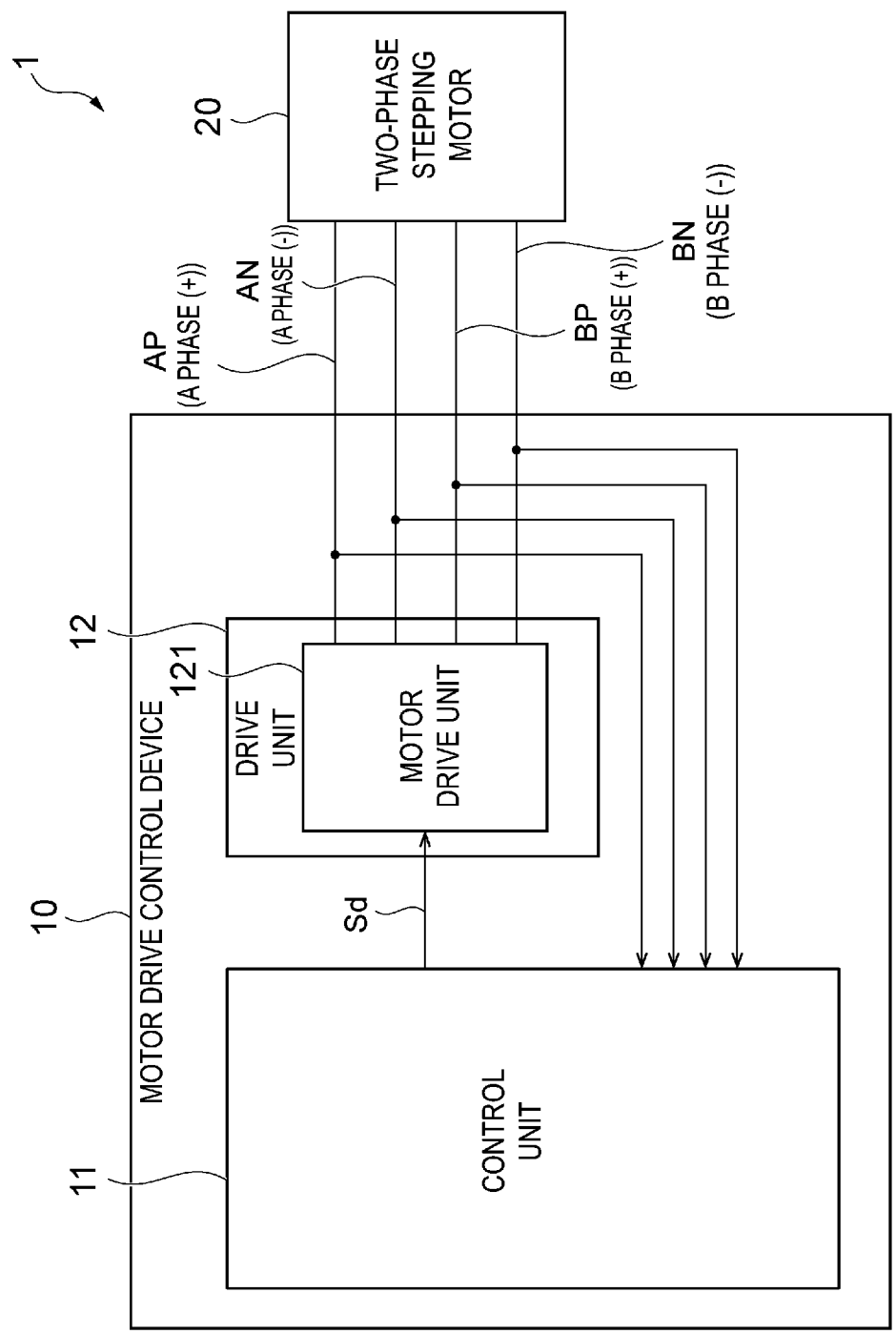
FIG. 1 is a block diagram illustrating a configuration of a motor unit according to an embodiment of the present invention.

First, an overview of a typical embodiment of the invention disclosed in the present application will be described. Note that, in the following description, reference signs in the drawings corresponding to the constituent elements of the invention are mentioned in parentheses as an example.

[1] A motor drive control device (10) according to a typical embodiment of the present invention includes a control unit (11) generating a control signal (Sd) for controlling driving of a two-phase stepping motor (20) such that one-phase excitation of exciting, of coils (21A, 21B) of two phases of the two-phase stepping motor, a coil for one phase, and two-phase excitation of exciting, of the coils of two phases, the coils for two phases are alternately repeated, and a drive unit (12) driving the coils of two phases based on the control signal, wherein an energization angle (θ) representing a magnitude of an electric angle for continuously energizing the coil of one phase in one direction is capable of being set in the control unit, and the control unit determines a period (T1n) for performing the one-phase excitation based on a back electromotive voltage generated in the coil non-excited in the one-phase excitation, and determines a period (T2n) for performing the two-phase excitation based on an elapsed time per unit angle while the two-phase stepping motor is being excited and the energization angle.

[2] In the motor drive control device described in [1] described above, the control unit may generate the control signal such that an excitation state of the two-phase stepping motor is switched from the one-phase excitation to the two-phase excitation according to a detection result of a zero crossing point of the back electromotive voltage generated in the coil non-excited in the period of the one-phase excitation, and the control unit may determine a target energization time period (T2n) based on the elapsed time per unit angle and the energization angle, and may generate the control signal such that the excitation state of the two-phase stepping motor is switched from the two-phase excitation to the one-phase excitation when the target energization time period elapses after start of the two-phase excitation.

[3] In the motor drive control device in [2] described above, the control unit may measure the period (T1n) of the one-phase excitation, and the elapsed time per unit angle may be a value obtained by dividing a measurement value of the period of the one-phase excitation by a magnitude of an electric angle corresponding to the period of the one-phase excitation.

[4] In the motor drive control device in [3] described above, when the measurement value of the period of the one-phase excitation is T1n, the energization angle is θ, and the target energization time period is T2n, the target energization time period may be calculated based on Equation (1) as will be described below.

[5] In the motor drive control device in [3] or [4] described above, the control unit may measure the period of the one-phase excitation performed immediately before the two-phase excitation, and may use the measured period as the measurement value of the period of the one-phase excitation.

[6] In the motor drive control device in [3] or [4] described above, the control unit may measure every period of a plurality of the periods of the one-phase excitation performed before the two-phase excitation, and may use an average value of the measured plurality of the periods as the measurement value of the period of the one-phase excitation.

[7] In the motor drive control device in [2] described above, the control unit may measure a time period between zero crossing points of the back electromotive voltage, and the elapsed time per unit angle may be a value obtained by dividing a measurement value of the time period between the zero crossing points by a magnitude of an electric angle between the zero crossing points.

[8] In the motor drive control device in [7] described above, when the measurement value of the time period between the zero crossing points of the back electromotive voltage is Tz, the measured magnitude of the electric angle between the zero crossing points is α, the energization angle is θ, and the target energization time period is T2n, the control unit may calculate the target energization time period based on Equation (3) as will be described later.

[9] In the motor drive control device in any one of [1] to [8] described above, the energization angle may be a value equal to or larger than 90° and equal to or smaller than 135°.

[10] A motor unit (1) according to a typical embodiment of the present invention includes the motor drive control device (10) in any one of [1] to [9] describe above, and the two-phase stepping motor (20).

[11] A method according to a typical embodiment of the present invention is a motor drive control method for controlling driving of a two-phase stepping motor (20) by a motor drive control device (10). The method includes a first step (S2, S4 to S7, S9 to S12) of generating, by the motor drive control device, a control signal for controlling driving of the two-phase stepping motor such that one-phase excitation of exciting, of coils (21A, 21B) of two phases of the two-phase stepping motor, a coil for one phase, and two-phase excitation of exciting, of the coils of two phases, the coils for two phases are alternately repeated, and a second step (S3, S8) of driving, by the motor drive control device, the coils of two phases based on the control signal, wherein an energization angle (θ) representing a magnitude of an electric angle for continuously energizing the coil of one phase in one direction is set in the motor drive control device, and the first step includes a third step (S4 to S7) of determining a period for performing the one-phase excitation based on a back electromotive voltage generated in the coil non-excited in the one-phase excitation, and a fourth step (S9 to S12) of determining a period for performing the two-phase excitation based on an elapsed time per unit angle while the two-phase stepping motor is being excited and the energization angle.

2. Specific Examples of Embodiments

Hereinafter, specific examples of the embodiments of the present invention will be described with reference to the accompanying drawings. Note that, in the following description, constituent elements common to each of the embodiments are denoted with the same reference signs and repeated descriptions will be omitted.

FIG. 1 is a block diagram illustrating a configuration of a motor unit according to an embodiment of the present invention.

As illustrated in FIG. 1, a motor unit 1 includes a two-phase stepping motor 20 and a motor drive control device 10 driving the two-phase stepping motor 20. For example, the motor unit 1 is applicable to various devices using, as a power source, a motor such as an actuator available for heating ventilation and air-conditioning (HVAC) serving as an air-conditioning unit for an on-board application.

Figure 2:
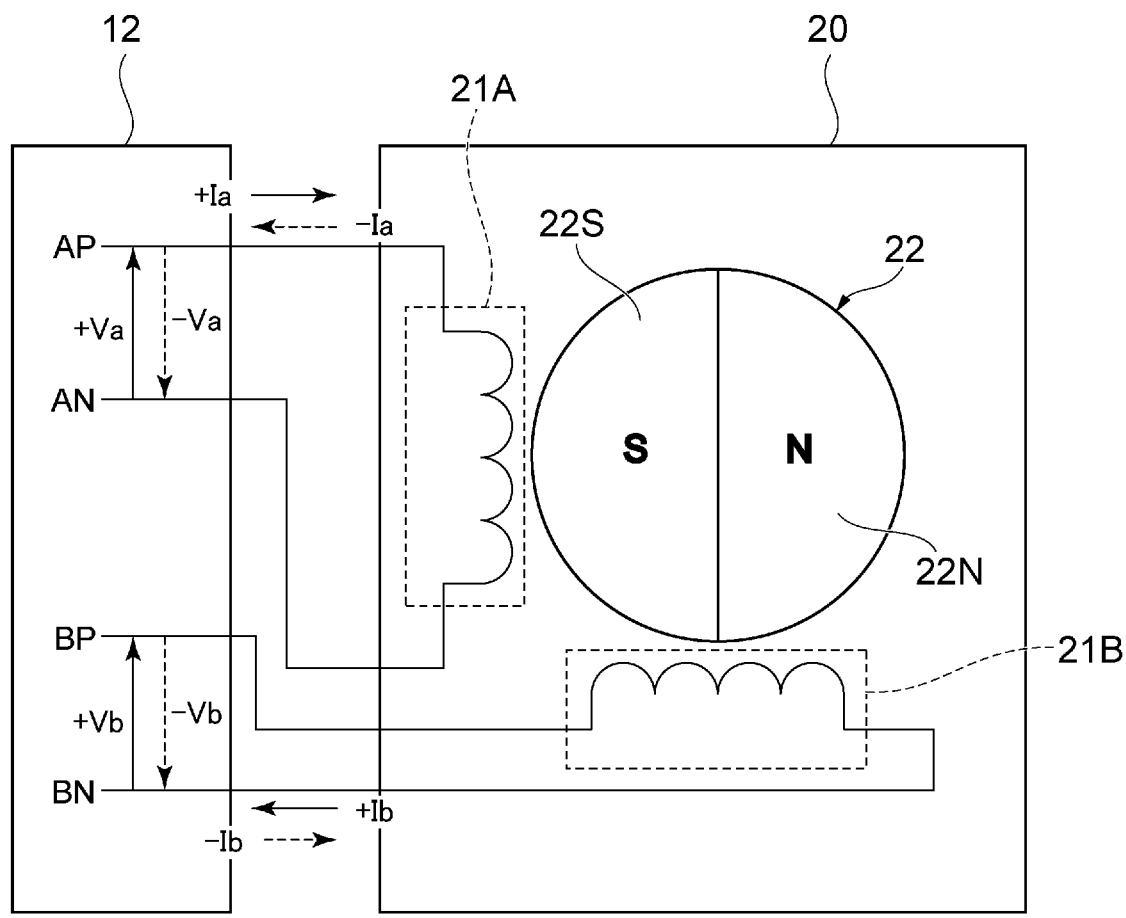
FIG. 2 is a diagram schematically illustrating a configuration of a motor according to the embodiment of the present invention.

FIG. 2 is a diagram schematically illustrating a configuration of the two-phase stepping motor 20 according to the embodiment of the present invention.

The two-phase stepping motor 20 is, for example, a stepping motor including coils of two phases. As illustrated in FIG. 2, the two-phase stepping motor 20 includes an A-phase coil 21A and a B-phase coil 21B, a rotor 22, and a two-phase stator yoke (not illustrated).

Each of the coils 21A and 21B is a coil exciting the stator yoke (not illustrated). Each of the coils 21A and 21B is connected to a drive unit 12 to be described later. Currents (coil currents) with different phases are caused to flow into the respective coils 21A and 21B.

Note that, in the present embodiment, when not being individually distinguished, the coils 21A and 21B may be simply denoted as a "coil 21".

The rotor 22 includes a permanent magnet subjected to multipolar magnetization along a circumferential direction such that an S pole 22S and an N pole 22N are alternately inverted. Note that in FIG. 2, a case of the rotor 22 with two poles is illustrated as an example.

The stator yoke is disposed around the rotor 22 in proximity to an outer circumferential part of the rotor 22. The phase of the coil current flowing through each of the coils 21A and 21B is periodically switched, so that the rotor 22 rotates. An output shaft (not illustrated) is connected to the rotor 22, and the output shaft is driven by rotational force of the rotor 22.

The motor drive control device 10 is a device for driving the two-phase stepping motor 20. For example, the motor drive control device 10 controls energizing states of the coils 21A and 21B of each of the phases of the two-phase stepping motor 20 based on a drive instruction, for example, from a host device (not illustrated) to control rotating and stopping of the two-phase stepping motor 20.

As illustrated in FIG. 1, the motor drive control device 10 includes a control unit 11 and a drive unit 12.

The drive unit 12 is a functional unit for driving the two-phase stepping motor 20 by energizing the coils 21A and 21B of the two-phase stepping motor 20. The drive unit 12 includes a motor drive unit 121.

The motor drive unit 121 supplies drive power to the two-phase stepping motor 20 based on a control signal Sd generated by the control unit 11. As illustrated in FIG. 2, the drive unit 12 is connected to a terminal AP at a positive electrode side of the coil 21A, a terminal AN at a negative electrode side of the coil 21A, a terminal BP at a positive electrode side of the coil 21B, and a terminal BN at a negative electrode side of the coil 21B, and energizes the coils 21A and 21B by applying a voltage to each of the terminals AP, AN, BP, and BN.

The motor drive unit 121 includes, for example, an H-bridge circuit including four switching elements (for example, transistors). The motor drive unit 121 selectively turns on and off each switching element constituting the H-bridge circuit to switch the energization of the coils 21A and 21B, for example.

As illustrated in FIG. 2, when a current of +Ia flows into the A-phase coil 21A, the motor drive unit 121 applies a voltage of "+Va" to the terminal AP with respect to the terminal AN of the coil 21A, for example. On the other hand, when a current of −Ia flows into the A-phase coil 21A, the motor drive unit 121 applies a voltage of "−Va" to the terminal AP with respect to the terminal AN of the coil 21A. Similarly, when a current of +Ib flows into the B-phase coil 21B, the motor drive unit 121 applies a voltage of "+Vb" to the terminal BP with respect to the terminal BN of the coil 21B, and when a current of −Ib flows into the B-phase coil 21B, the motor drive unit 121 applies a voltage of "−Vb" to the terminal BP with respect to the terminal BN of the coil 21B, for example.

The motor drive unit 121 switches the energizing state of each of the coils 21A and 21B by switching the voltage to be applied between the terminals of each of the coils 21A and 21B as described above, based on the control signal Sd from the control unit 11.

The control unit 11 is a functional unit for performing centralized control of the motor drive control device 10. The control unit 11 is a program processing device (for example, a microcontroller) having a configuration of including, for example, a processor such as a CPU, various types of storage devices such as a RAM and a ROM, and peripheral circuits such as a timer (counter), an A/D conversion circuit, a D/A conversion circuit, and an input/output I/F circuit connected to each other via a bus. In the present embodiment, the control unit 11 is packaged as an integrated circuit (IC), but is not limited to such a packaged unit.

The control unit 11 generates the control signal Sd for controlling the driving of the two-phase stepping motor 20, and controls the driving of the two-phase stepping motor 20 through the drive unit 12. Specifically, the control unit 11 generates the control signal Sd for controlling the driving of the two-phase stepping motor 20 such that the one-phase excitation of exciting, of the coils 21A and 21B of two phases of the two-phase stepping motor 20, the coil 21 for one phase and the two-phase excitation of exciting the coils 21 for two phases are alternately repeated. That is, the control unit 11 performs the energization switching control of the coils 21A and 21B of the two-phase stepping motor 20 by the one-two-phase excitation system.

In the energization switching control by the one-two-phase excitation system according to the present embodiment, an energization angle θ representing a magnitude of an electric angle for continuously energizing a coil of one phase in one direction is not fixed, and can be set to a desired value. Details will be described below.

Figure 3:
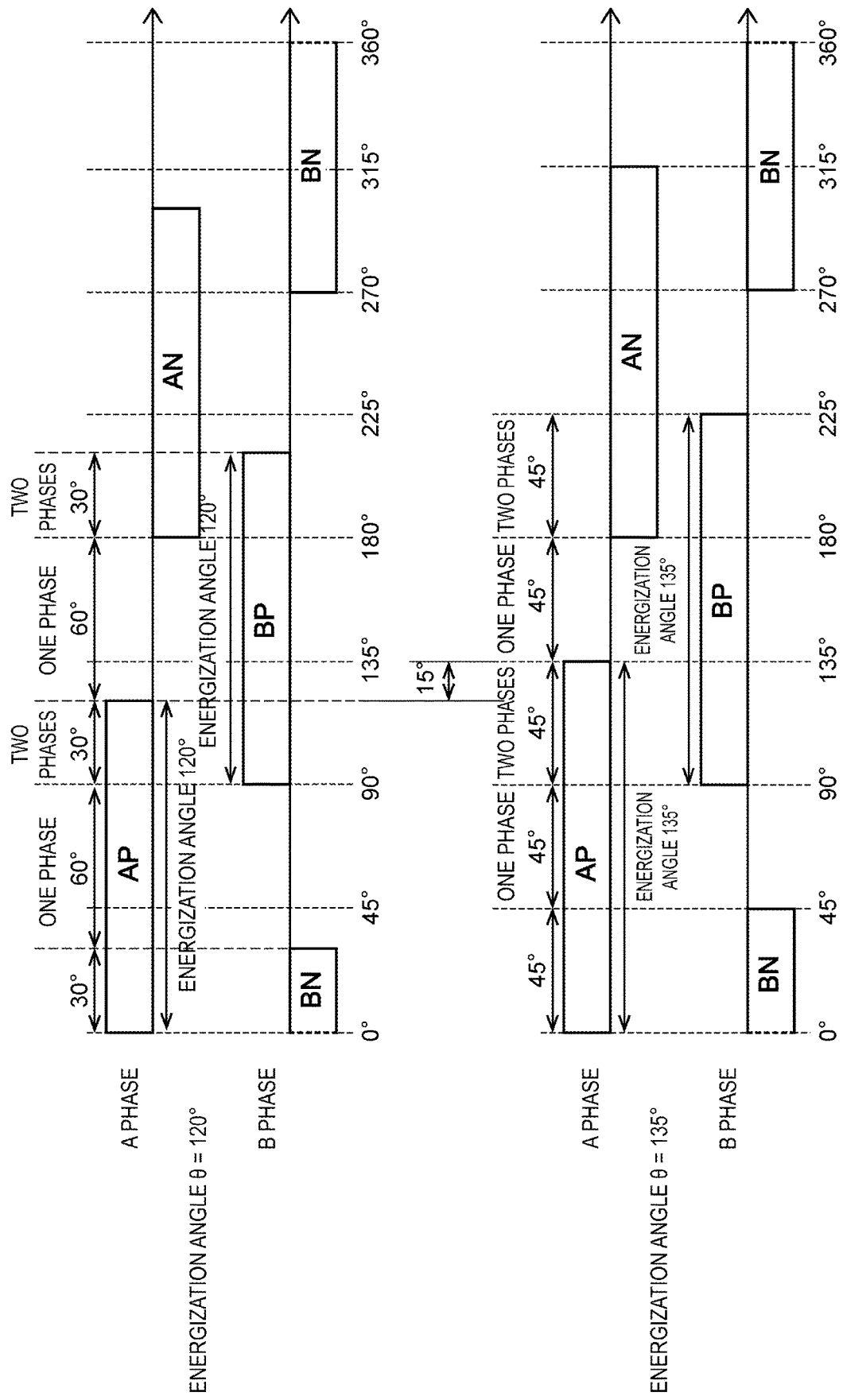
FIG. 3 is a diagram for describing an outline of energization switching control of a two-phase stepping motor by a one-two-phase excitation system according to the embodiment of the present invention.

FIG. 3 is a diagram for describing an outline of the energization switching control of the two-phase stepping motor by the one-two-phase excitation system according to the embodiment of the present invention.

In FIG. 3, the horizontal axis represents an electric angle. Respective excitation states of the A-phase coil 21A and the B-phase coil 21B in a case of the energization angle θ=120° are illustrated in the upper part of this figure, and respective excitation states of the A-phase coil 21A and the B-phase coil 21B in a case of the energization angle θ=135° are illustrated in the lower part of this figure. Note that the periods represented by the signs AP, AN, BP, and BN in the diagram indicate that voltages are applied to respective terminals (for example, the terminal AP at the positive electrode side of the A-phase coil 21A) corresponding to these signs.

As illustrated in the lower part of FIG. 3, when the energization angle θ is set to 135° as in the conventional one-two-phase excitation system, an electric angle for each of a period of the one-phase excitation and a period of the two-phase excitation is 45°, a zero crossing point of a back electromotive voltage needs to be detected within the period of the one-phase excitation with the electric angle of 45°.

On the other hand, as illustrated in the upper part in FIG. 3, when the energization angle θ is set to 120°, an electric angle for a period of the one-phase excitation is 60°, and an electric angle for a period of the two-phase excitation is 30°. In other words, when the energization angle θ is set to 120°, the period of the one-phase excitation becomes longer by a period corresponding to an electric angle 15° than in a case of setting the energization angle θ to 135°, so that a zero crossing point of a back electromotive voltage can be detected more easily.

Thus, the motor drive control device 10 according to the present embodiment is configured such that the energization angle θ can be set to any value within a range of 90° to 135° (90°≤θ≤135°) so that a zero crossing point of a back electromotive voltage can be detected within a period of the one-phase excitation. The motor drive control device 10 performs the energization switching control of the two-phase stepping motor 20 by the one-two-phase excitation system based on a set value of the energization angle θ.

Figure 4:
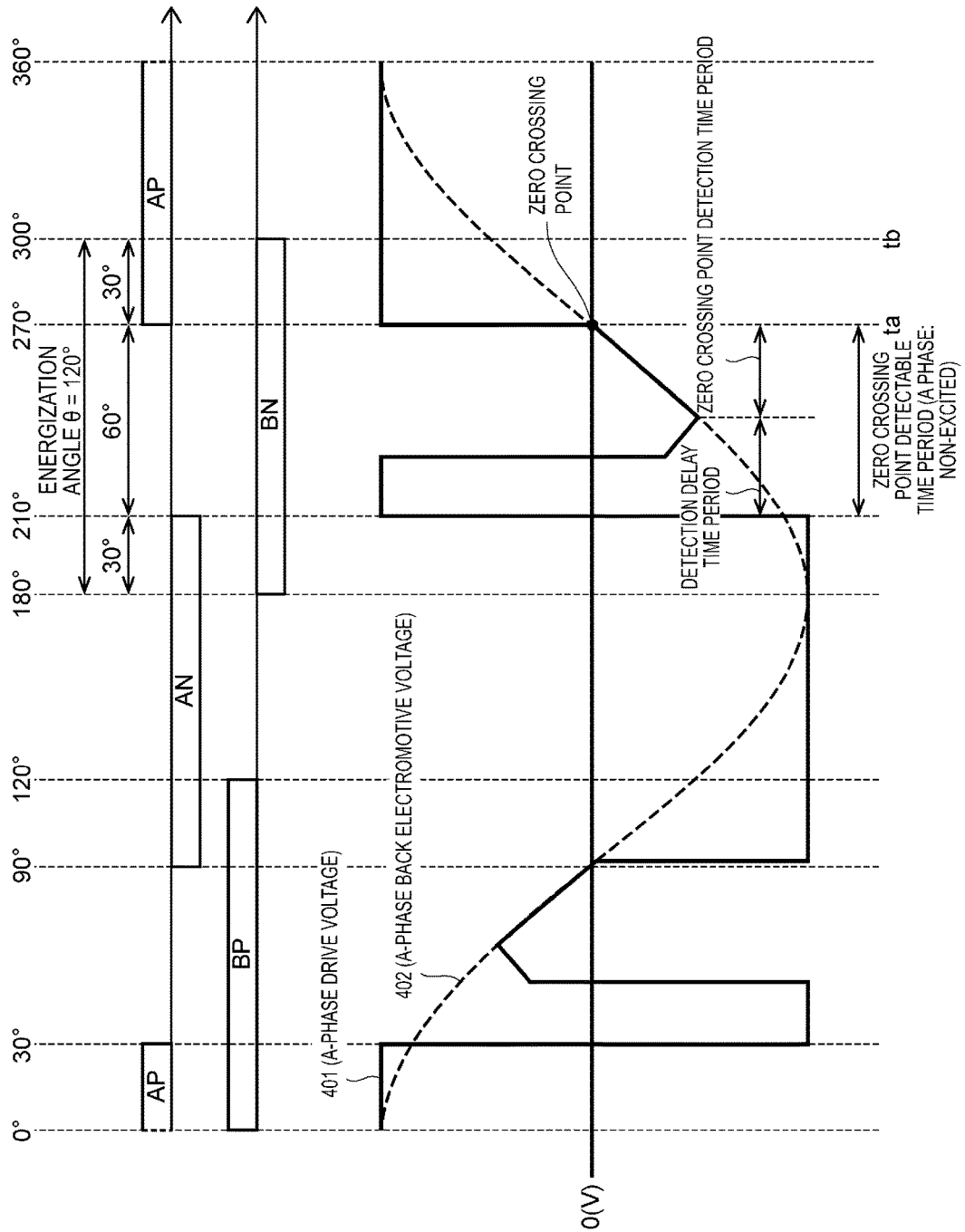
FIG. 4 is a diagram for describing the energization switching control of the two-phase stepping motor by a motor drive control device according to the embodiment of the present invention.

FIG. 4 is a diagram for describing the energization switching control of the two-phase stepping motor by the motor drive control device 10 according to the embodiment of the present invention.

In this diagram, a reference sign of 401 represents a voltage of the terminal AP with respect to the terminal AN of the A-phase coil 21A (hereinafter, also referred to as an "A-phase voltage"), and a reference sign of 402 represents a back electromotive voltage of the A-phase coil 21A. This diagram illustrates a voltage waveform of the A-phase coil 21A in a case of setting the energization angle θ=120° and performing the energization switching control of the two-phase stepping motor 20 by the one-two-phase excitation system.

As illustrated in FIG. 4, the control unit 11 switches the energizing states of the two-phase stepping motor 20 such that the one-phase excitation and the two-phase excitation are alternately repeated. For example, in FIG. 4, in a period of the two-phase excitation from 180° to 210° (with an electric angle of 30+), the A-phase coil 21A is excited to be negative (−) with the A-phase voltage being set to "−Va", and the B-phase coil 21B is excited to be negative with the B-phase voltage being set to "−Vb". In the next period of the one-phase excitation (with an electric angle of 60°) from 210° to 270°, the A-phase coil 21A is not excited with the A-phase voltage being set to "0", while the B-phase coil 21B is continuously excited to be negative with the B-phase voltage being set to "−Vb". In the next period of the two-phase excitation (with the electric angle of 30°) from 270° to 300°, the A-phase coil 21A is excited to be positive (+) with the A-phase voltage being set to "+Va", and the B-phase coil 21B is continuously excited to be negative with the B-phase voltage being set to "−Vb".

Here, the period for performing the one-phase excitation of the two-phase stepping motor 20 and the period for performing the two-phase excitation are determined based on a back electromotive voltage generated in the A-phase coil 21A or the B-phase coil 21B and the set value of the energization angle θ. That is, in the motor unit 1, the period of the one-phase excitation and the period of the two-phase excitation of the two-phase stepping motor 20 are not fixed periods but variable periods.

First, the period of the one-phase excitation of the two-phase stepping motor 20 is determined as follows.

The period of the one-phase excitation of the two-phase stepping motor 20 is determined based on the back electromotive voltage generated in the other non-excited coil 21 when one coil 21 is excited.

Specifically, the control unit 11 generates the control signal Sd so as to switch the excitation state of the two-phase stepping motor 20 from the one-phase excitation to the two-phase excitation according to a detection result of a zero crossing point of a back electromotive voltage generated in the non-excited coil 21 in the period of the one-phase excitation.

For example, as illustrated in FIG. 4, in a period of the one-phase excitation while the electric angle is from 210° to 270°, a spike-like voltage in a positive direction is generated in the non-excited A-phase coil 21A, and then, a back electromotive voltage synchronized to the rotation of the rotor of the two-phase stepping motor 20 is generated. Thereafter, the control unit 11 generates the control signal Sd so as to perform switching from the one-phase excitation to the two-phase excitation when detecting a point of the back electromotive voltage of the A-phase coil 21A becoming 0 V (zero crossing point) at a time ta.

Next, the period of the two-phase excitation of the two-phase stepping motor 20 is determined as follows.

As described above, in the period for performing the one-phase excitation of the two-phase stepping motor 20, a back electromotive voltage is generated in the non-excited coil 21. On the other hand, in the period for performing the two-phase excitation of the two-phase stepping motor 20 (for example, the period while the electric angle is from 180° to 210° and the period while the electric angle is from 270° to 300° in FIG. 4, and the like), both of the A-phase coil 21A and the B-phase coil 21B are excited, and thus, the back electromotive voltage of any of the A-phase coil 21A and the B-phase coil 21B cannot be measured. Thus, unlike the switching from the one-phase excitation to the two-phase excitation, a timing of switching from the two-phase excitation to the one-phase excitation cannot be determined based on the back electromotive voltage of the coil 21.

Thus, the control unit 11 determines the period for performing the two-phase excitation based on the elapsed time per unit angle while the two-phase stepping motor 20 is being excited and the preset energization angle θ.

Specifically, the control unit 11 determines the period for performing the two-phase excitation, that is, a target energization time period T2n of the two-phase excitation, based on the elapsed time per unit angle while the two-phase stepping motor 20 is being excited and the energization angle θ. The target energization time period T2n of the two-phase excitation can be determined, for example, by a first technique and a second technique to be described below.

The first technique is a technique of measuring a period of the one-phase excitation and calculating the target energization time period T2n by using the measured period.

Figure 5:
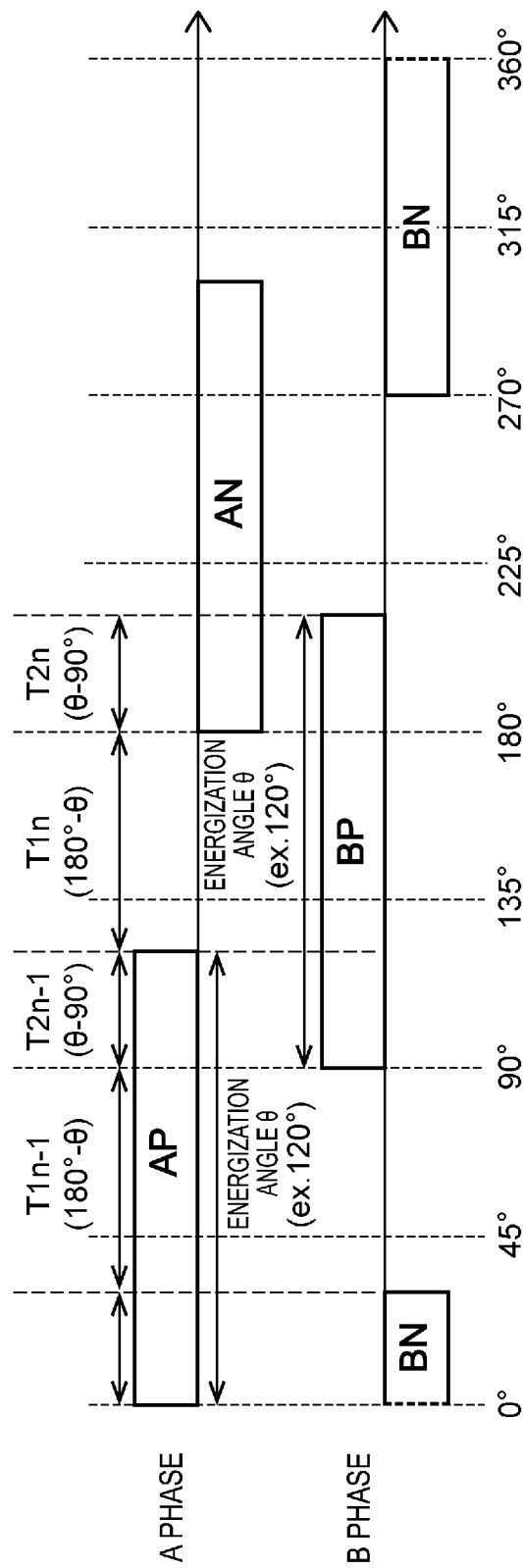
FIG. 5 is a diagram for describing a method for determining a target energization time period of two-phase excitation by a first technique according to the present embodiment.

FIG. 5 is a diagram for describing a method for determining the target energization time period of the two-phase excitation by the first technique according to the present embodiment.

In FIG. 5, the horizontal axis represents time and an electric angle. In addition, in the upper part of this diagram, the energizing state of the A phase is illustrated, and in the lower part of the same diagram, the energizing state of the B phase is illustrated. In FIG. 5, T1n represents an n-th period (n is an integer equal to or larger than 1) of the one-phase excitation, T1n−1 represents an (n−1)-th period of the one-phase excitation, T2n represents an n-th period of the two-phase excitation, and T2n−1 represents an (n−1)-th period of the two-phase excitation.

In FIG. 5, when the energization angle is θ, each magnitude of the electric angles corresponding to the periods T$n$−1 and T1n of the one-phase excitation can be expressed as (180°−θ). Also, each magnitude of the electric angles corresponding to the periods T2n−1 and T2n of the two-phase excitation can be expressed as (θ−90°).

As illustrated in FIG. 5, first, the control unit 11 measures the period T1n of the one-phase excitation. Next, the control unit 11 calculates an elapsed time per unit angle based on a measurement value of the period T1n of the one-phase excitation and the magnitude of the electric angle (180°−θ) corresponding to the period T1n of the one-phase excitation, and calculates the target energization time period T2n of the next two-phase excitation based on the calculated elapsed time and the set energization angle θ.

For example, the control unit 11 calculates the target energization time period T2n based on Equation (1) to be described below.

]Equation 1[

$$T2n = \frac{T1n}{(180° - \theta)} \times (\theta - 90°) \qquad (1)$$

In Equation (1) described above, "T1n/(180°−θ)" represents the elapsed time per unit angle when the two-phase stepping motor 20 is subjected to the one-phase excitation, that is, a period of time required for advancing the electric angle by the unit angle (1°) in the period T1n of the one-phase excitation. Also, (θ−90°) is an electric angle corresponding to the period of the two-phase excitation.

For example, when the energization angle θ is 120°, Equation (1) can be denoted by Equation (2) to be described below.

]Equation 2[

$$T2n = \frac{T1n}{60°} \times 30° \qquad (2)$$

As will be appreciated from Equation (2), the target energization time period (the period of the two-phase excitation) T2n is a period of time required for performing energization by the electric angle of 30°.

Note that the control unit 11 may measure the period of the one-phase excitation performed immediately before the two-phase excitation when calculating the target energization time period T2n of the two-phase excitation based on Equation (1) described above, and may use the period as a measurement value of the period T1n of the one-phase excitation. Alternatively, every period of a plurality of periods of the one-phase excitation performed before the two-phase excitation is measured, and then, an average value of the measured plurality of periods may be used as a measurement value of the period T1n of the one-phase excitation.

Here, the average value of the plurality of periods of the one-phase excitation may be a simple average value, or the average value may be calculated with weights added to the plurality of periods of the one-phase excitation performed before the two-phase excitation and the target energization time period T2n is set based on the average value. For example, the average value may be calculated with a weight added to each period of the one-phase excitation such that a specific weight increases as a period is temporally closer to the two-phase excitation being a calculation target of the target energization time period T2n.

The second technique is a technique of measuring a time period between zero crossing points of a back electromotive voltage and calculating the target energization time period T2n of the two-phase excitation by using the measured time period.

First, the control unit 11 measures a time period between zero crossing points of a back electromotive voltage of the coil 21. Next, the control unit 11 calculates an elapsed time per unit angle based on the measurement value of the time period between the zero crossing points of the back electromotive voltage and the magnitude of the corresponding electric angle between the zero crossing points, and calculates the target energization time period T2n of the two-phase excitation based on the calculated elapsed time and the set energization angle θ.

For example, when the measurement value of the time period between the zero crossing points of the back electromotive voltage is T0n, the corresponding electric angle between the measured zero crossing points is α, the energization angle is θ, and the target energization time period of the two-phase excitation is T2n, the control unit 11 calculates the target energization time period T2n of the two-phase excitation based on the following Equation (3).

[Equation 3]

$$T2n = \frac{T0n}{\alpha} \times (\theta - 90°) \quad (3)$$

In Equation (3) described above, T0n/α represents the elapsed time per unit angle while the two-phase stepping motor 20 is being excited. Also, (θ−90°) represents an electric angle corresponding to a period of the two-phase excitation.

For example, in a case of the two-phase stepping motor 20 having two poles, the electric angle α between a zero crossing point of a back electromotive voltage of the A-phase coil 21A and a zero crossing point of a back electromotive voltage of the B-phase coil 21B is 90°. Here, when the energization angle θ is 120°, Equation (3) can be expressed by using the following Equation (4).

[Equation 4]

$$T2n = \frac{T0n}{90°} \times 30° \quad (4)$$

As will be appreciated from Equation (4), the target energization time period (the period of the two-phase excitation) T2n is a period of time required for performing energization by the electric angle of 30°.

The control unit 11 determines the target energization time period T2n of the two-phase excitation based on the above-described first technique or second technique. Then, the control unit 11 generates the control signal Sd so as to switch the excitation state of the two-phase stepping motor 20 from the two-phase excitation to the one-phase excitation when the target energization time period T2n elapses after the start of the two-phase excitation.

For example, as illustrated in FIG. 4, in the period for performing the two-phase excitation while the electric angle is from 270° to 300°, both of the A-phase coil 21A and the B-phase coil 21B are excited, and thus, a back electromotive voltage cannot be measured. Thus, the control unit 11 generates the control signal Sd so as to perform switching from the two-phase excitation to the one-phase excitation at a time tb (the electric angle of 300°) after the elapse of the target energization time period T2n corresponding to the electric angle 30° from the start of the two-phase excitation at the time to (the electric angle of 270°).

In the following description, a case of determining, by the control unit 11, the target energization time period T2n of the two-phase excitation by using the first technique will be described as an example.

Figure 6:
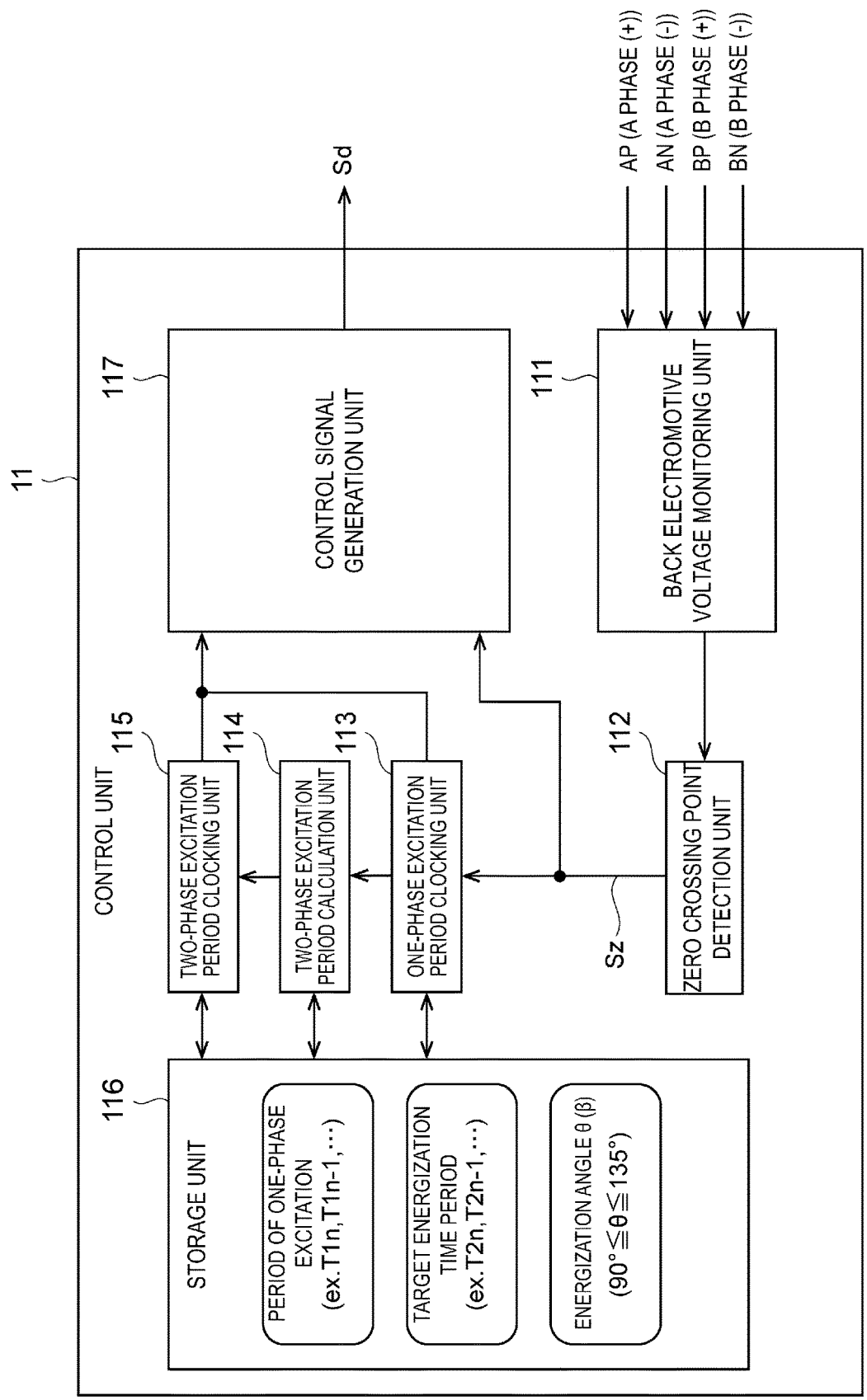
FIG. 6 is a diagram illustrating a functional block configuration of a control unit of the motor drive control device according to the embodiment of the present invention.

FIG. 6 is a diagram illustrating a functional block configuration of the control unit 11 of the motor drive control device according to the embodiment of the present invention.

As illustrated in FIG. 6, the control unit 11 includes, as functional units for implementing the above-described energization switching control of the coils 21A and 21B of the two-phase stepping motor 20, a back electromotive voltage monitoring unit 111, a zero crossing point detection unit 112, a one-phase excitation period clocking unit 113, a two-phase excitation period calculation unit 114, a two-phase excitation period clocking unit 115, a storage unit 116, and a control signal generation unit 117.

In a program processing device (the microcontroller) serving as the control unit 11 described above, these functional units are achieved, for example, by a processor executing various types of arithmetic processes in accordance with a program stored in a storage device, and controlling peripheral circuits such as an A/D conversion circuit and a timer.

The back electromotive voltage monitoring unit 111 is a functional unit for monitoring a back electromotive voltage generated in the coils 21A and 21B of the respective phases.

The zero crossing point detection unit 112 is a functional unit for detecting a zero crossing point of a back electromotive voltage generated in the coils 21A and 21B of the two-phase stepping motor 20 based on a monitoring result from the back electromotive voltage monitoring unit 111. When detecting a zero crossing point of a back electromotive voltage of the non-excited coil 21, the zero crossing point detection unit 112 outputs a detection signal Sz indicating that the zero crossing point has been detected.

The one-phase excitation period clocking unit 113 is a functional unit for measuring a period of the one-phase excitation of the two-phase stepping motor 20. The one-phase excitation period clocking unit 113 can be implemented, for example, by using a timer (counter) constituting the microcontroller described above, or the like.

The one-phase excitation period clocking unit 113 starts clocking in response to switching of the excitation state of the two-phase stepping motor 20 from the two-phase excitation to the one-phase excitation. For example, the one-phase excitation period clocking unit 113 starts measuring the period T1$n$ of the one-phase excitation according to a signal for notifying the end of the period of the two-phase excitation, the signal being output from the two-phase excitation period clocking unit 115 to be described below.

The one-phase excitation period clocking unit 113 stops the clocking when a zero crossing point of a back electromotive voltage is detected. For example, according to the detection signal Sz output from the zero crossing point detection unit 112 and indicating that the zero crossing point has been detected, the one-phase excitation period clocking unit 113 stops measuring the period T1$n$ of the one-phase excitation, stores the measurement value of the period T1$n$ of the one-phase excitation in the storage unit 116, and outputs a notification signal indicating the end of the period of the one-phase excitation to the two-phase excitation period calculation unit 114.

Here, the storage unit 116 may store information about a plurality of periods of the one-phase excitation measured by the one-phase excitation period clocking unit 113, or may store only information about the latest period of the one-phase excitation.

The storage unit 116 is a functional unit for storing various types of data necessary for performing the energization switching control of the two-phase excitation. The storage unit 116 stores data for calculating the target energization time period T2$n$ of the two-phase excitation. The storage unit 116 stores, for example, the measurement value of the period T1$n$ of the one-phase excitation measured by the one-phase excitation period clocking unit 113 described above, the energization angle θ, and information about Equation (1) described above.

The two-phase excitation period calculation unit 114 is a functional unit for calculating the target energization time period T2$n$ of the two-phase excitation of the two-phase stepping motor 20. The two-phase excitation period calculation unit 114 calculates the target energization time period T2$n$ of the two-phase excitation in response to switching of the excitation state of the two-phase stepping motor 20 from the one-phase excitation to the two-phase excitation.

The two-phase excitation period calculation unit 114 reads out data necessary for calculating the target energization time period T2$n$ of the two-phase excitation from the storage unit 116 according to the signal output from the one-phase excitation period clocking unit 113 and indicating the end of the period of the one-phase excitation, and calculates the target energization time period T2$n$. For example, the two-phase excitation period calculation unit 114 reads out the value of the energization angle θ, the measurement value of the period (T1$n$) of the one-phase excitation, and the information about Equation (1) described above from the storage unit 116, calculates the target energization time period T2$n$ based on Equation (1) described above, and stores the target energization time period T2$n$ in the storage unit 116.

After calculating the target energization time period T2$n$, the two-phase excitation period calculation unit 114 instructs the two-phase excitation period clocking unit 115 to start measuring the period of the two-phase excitation.

The two-phase excitation period clocking unit 115 is a functional unit for measuring a period of the two-phase excitation of the two-phase stepping motor 20. The two-phase excitation period clocking unit 115 can be implemented, for example, by using a timer (counter) constituting the microcontroller described above, or the like.

The two-phase excitation period clocking unit 115 starts measuring the period of the two-phase excitation according to the instruction to start the measurement from the two-phase excitation period calculation unit 114. For example, the two-phase excitation period clocking unit 115 reads out the target energization time period T2$n$ from the storage unit 116 according to the instruction to start the measurement from the two-phase excitation period calculation unit 114, sets the target energization time period T2$n$ in the timer of the two-phase excitation period clocking unit 115, starts the measurement, and outputs a signal indicating the end of the two-phase excitation when a measurement time reaches the target energization time period T2$n$.

Note that when the first technique described above is used as the method for determining the target energization time period T2$n$ of the two-phase excitation, the timer included in the one-phase excitation period clocking unit 113 and the timer included in the two-phase excitation period clocking unit 115 are not simultaneously used. Thus, in this case, only one timer may be provided and shared by the one-phase excitation period clocking unit 113 and the two-phase excitation period clocking unit 115.

On the other hand, when the second technique described above is used as the method for determining the target energization time period T2$n$ of the two-phase excitation, the timer included in the one-phase excitation period clocking unit 113 measures a period of time between zero crossing points of the back electromotive voltage, and the timer included in the two-phase excitation period clocking unit 115 measures a period of the two-phase excitation. Thus, a period of simultaneously using the respective timers of the one-phase excitation period clocking unit 113 and the two-phase excitation period clocking unit 115 occurs. Thus, in this case, since the one-phase excitation period clocking unit 113 and the two-phase excitation period clocking unit 115 cannot share a single timer, each of the one-phase excitation period clocking unit 113 and the two-phase excitation period clocking unit 115 needs to include a timer.

The control signal generation unit 117 is a functional unit for generating the control signal Sd for controlling driving of the two-phase stepping motor 20. The control signal generation unit 117 can be implemented, for example, by program processing by the processor constituting the microcontroller described above and a peripheral circuit such as an input/output I/F circuit.

The control signal generation unit 117 instructs switching between the one-phase excitation and the two-phase excitation of the two-phase stepping motor 20 by using the control signal Sd.

In the one-phase excitation, the control signal generation unit 117 generates the control signal Sd so as to switch the excitation state of the two-phase stepping motor 20 from the one-phase excitation to the two-phase excitation according to the detection result of the zero crossing point of the back electromotive voltage by the zero crossing point detection unit 112. For example, the control signal generation unit 117 generates the control signal Sd so as to switch the excitation state of the two-phase stepping motor 20 from the one-phase excitation to the two-phase excitation according to the detection signal Sz from the zero crossing point detection unit 112.

Note that the control signal generation unit 117 may generate the control signal Sd so as to switch the excitation state of the two-phase stepping motor 20 from the one-phase excitation to the two-phase excitation according to the signal indicating the end of the one-phase excitation output from the one-phase excitation period clocking unit 113, instead of the detection signal Sz from the zero crossing point detection unit 112.

Additionally, the control signal generation unit 117 generates the control signal Sd so as to switch the excitation state of the two-phase stepping motor 20 from the two-phase excitation to the one-phase excitation when the measurement time by the two-phase excitation period clocking unit 115 reaches the target energization time period T2$n$ in the two-phase excitation. For example, the control signal generation unit 117 generates the control signal Sd so as to switch the excitation state of the two-phase stepping motor 20 from the two-phase excitation to the one-phase excitation according to the signal indicating the end of the two-phase excitation output from the two-phase excitation period clocking unit 115.

The drive unit 12 (motor drive unit 121) performs the energization switching of the two-phase stepping motor 20 by the technique described above based on the control signal Sd output from the control signal generation unit 117.

Figure 7:
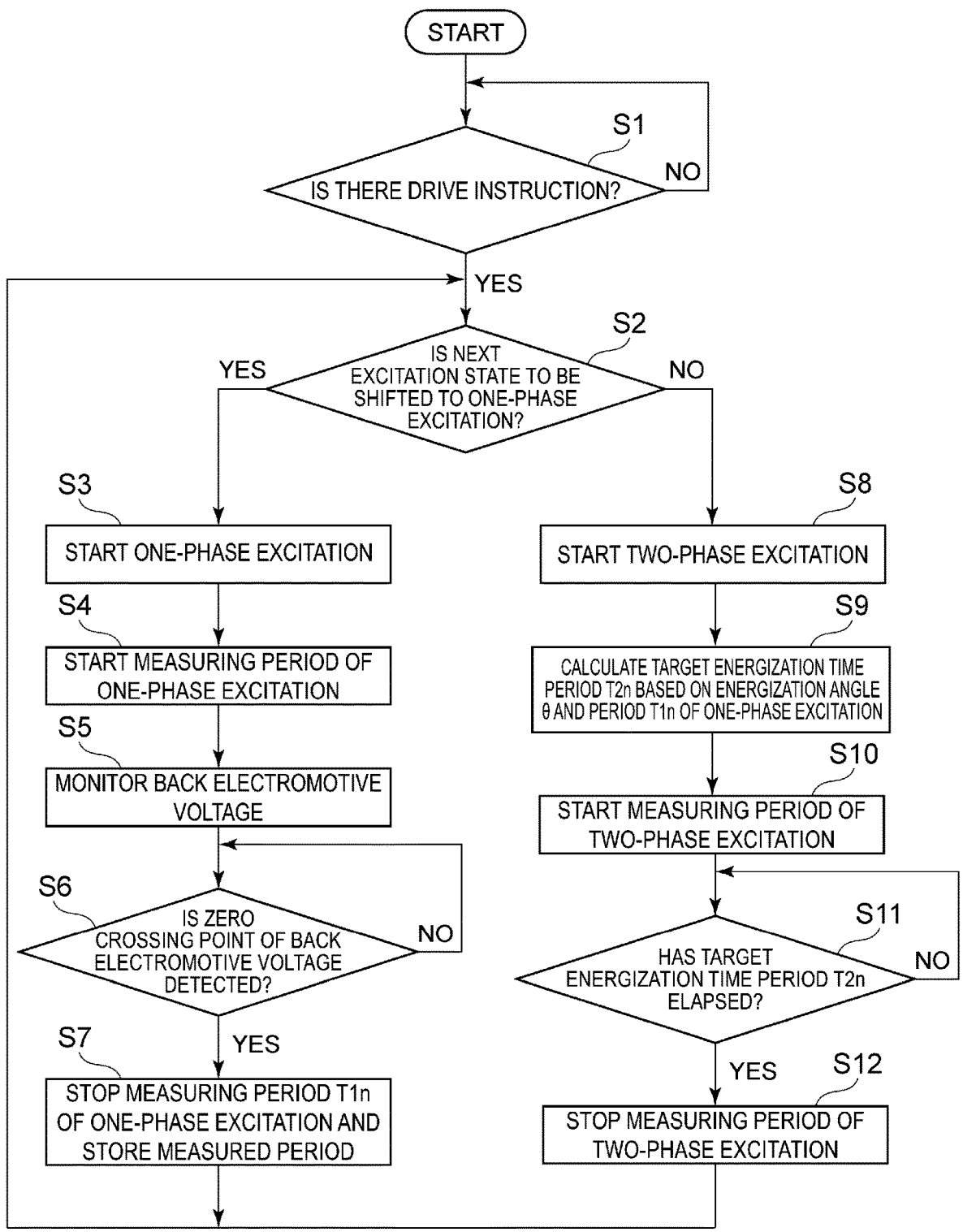
FIG. 7 is a flowchart illustrating a specific example of a procedure of the energization switching control of the two-phase stepping motor by the motor drive control device according to the present embodiment.
Figure 8:
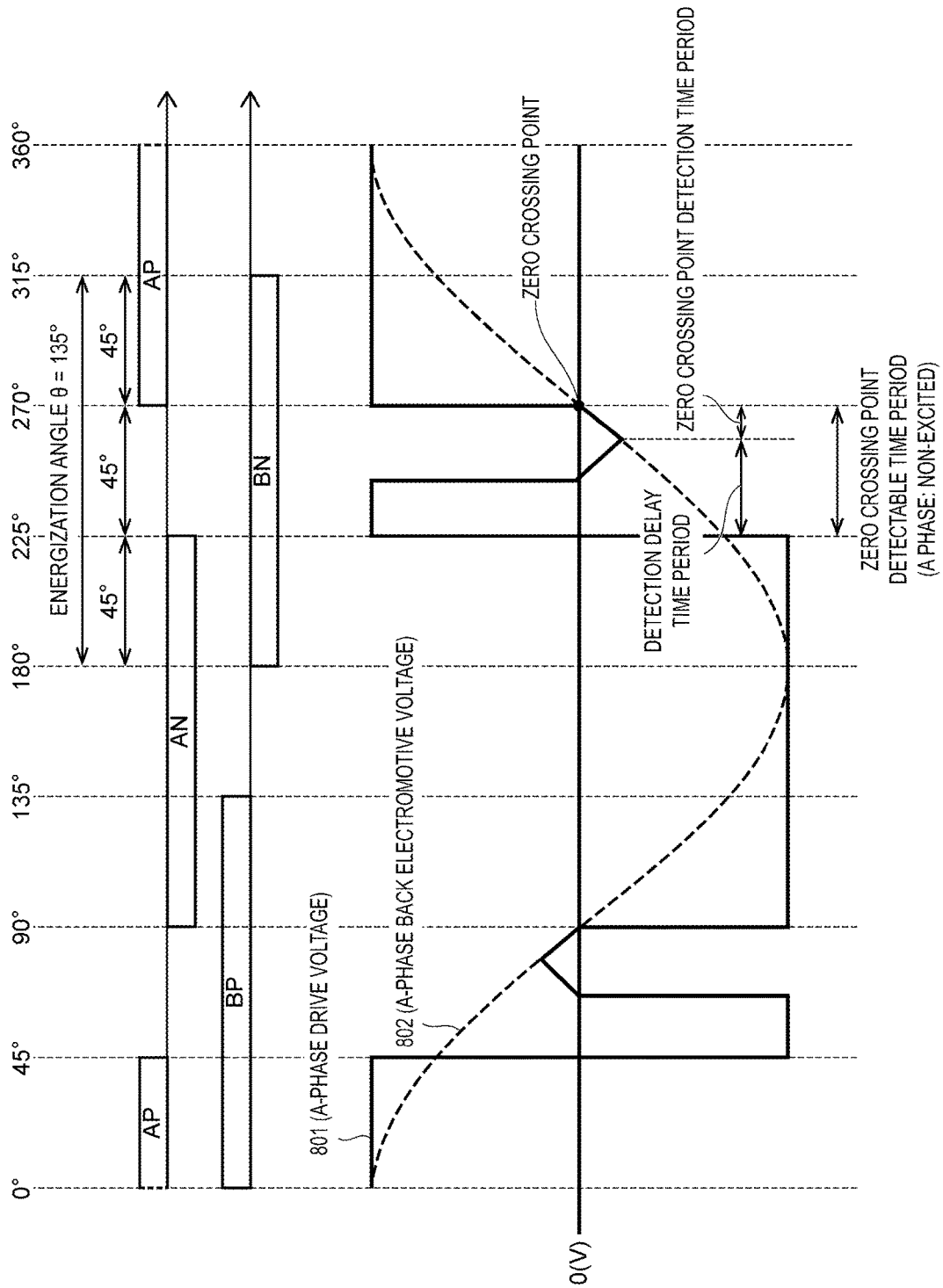
FIG. 8 is a diagram for describing energization switching control of a two-phase stepping motor by a conventional one-two-phase excitation system with an energization angle fixed to 135°.

FIG. 7 is a flowchart illustrating a specific example of a procedure of the energization switching control of the two-phase stepping motor 20 by the motor drive control device 10 according to the present embodiment.

The motor drive control device 10 determines whether or not a drive instruction of the two-phase stepping motor 20 is input from an external host device after power is turned on, for example (step S1). When the drive instruction is not input (step S1: NO), the motor drive control device 10 waits until the drive instruction is input.

On the other hand, when the drive instruction is input (step S1: YES), the motor drive control device 10 starts driving of the two-phase stepping motor 20. First, the motor drive control device 10 determines whether or not the next excitation state of the two-phase stepping motor 20 to be shifted to is the one-phase excitation (step S2). Here, as an example, a case of first performing the one-phase excitation of the A phase after power is turned on will be described.

In step S2, the next excitation state to be shifted to is the one-phase excitation of the phase A (step S2: YES), and thus, the motor drive control device 10 drives the two-phase stepping motor 20 in the one-phase excitation (step S3). For example, the control signal generation unit 117 applies the A-phase voltage "+Va" to the A-phase coil 21A of the two-phase stepping motor 20, generates the control signal Sd so that the B-phase voltage of the B-phase coil 21B becomes "0", and provides the generated control signal Sd to the drive unit 12.

Also, the motor drive control device 10 starts clocking a period for performing the one-phase excitation (step S4). Specifically, the one-phase excitation period clocking unit 113 starts measuring the period T1$n$ of the one-phase excitation.

Next, the motor drive control device 10 monitors a back electromotive voltage of the non-excited coil 21 of the two-phase stepping motor 20 (step S5).

Next, the motor drive control device 10 determines whether or not a zero crossing point of the back electromotive voltage of the non-excited coil 21 is detected (step S6). For example, the zero crossing point detection unit 112 determines whether or not a zero crossing point of the back electromotive voltage of the non-excited coil 21 is generated based on a monitoring result of the back electromotive voltage monitoring unit 111.

Note that the respective processes of steps S3 to S5 are not limited to processes performed in the order described above, and may be simultaneously performed.

When a zero crossing point of the back electromotive voltage is not detected (step S6: NO), the zero crossing point detection unit 112 continuously monitors the occurrence of a zero crossing point of the back electromotive voltage. When a zero crossing point of the back electromotive voltage is detected (step S6: YES), the motor drive control device 10 stops measuring the period T1$n$ of the one-phase excitation (step S7). Specifically, the zero crossing point detection unit 112 outputs the detection signal Sz indicating that the zero crossing point of the back electromotive voltage has been detected, and the one-phase excitation period clocking unit 113 stops clocking of the period T1$n$ of the one-phase excitation according to the detection signal Sz, stores the measurement value of the period T1$n$ of the one-phase excitation in the storage unit 116, and outputs a signal indicating that the one-phase excitation has ended.

Next, the motor drive control device 10 returns again to step S2, and then, determines whether or not the next excitation state to be shifted to is the one-phase excitation (step S2).

Here, since the immediately preceding excitation state has been the one-phase excitation, the motor drive control device 10 determines that the next excitation state to be shifted to is the two-phase excitation (step S2: NO), and switches the excitation state of the two-phase stepping motor 20 from the one-phase excitation to the two-phase excitation (step S8). For example, according to the detection signal Sz output from the zero crossing point detection unit 112, the control signal generation unit 117 generates the control signal Sd so as to apply the A-phase voltage "+Va" to the A-phase coil 21A and to apply the B-phase voltage "+Vb" to the B-phase coil 21B, and provides the control signal Sd to the drive unit 12.

Next, the motor drive control device 10 calculates the target energization time period T2$n$ of the two-phase excitation (step S9). Specifically, as described above, according to the notification signal output from the one-phase excitation period clocking unit 113 and indicating the end of the period T1$n$ of the one-phase excitation, the two-phase excitation period clocking unit 115 reads out the value of the energization angle θ, the measurement value of the period (T1$n$) of the one-phase excitation, and the information about Equation (1) described above from the storage unit 116, calculates the target energization time period T2$n$ based on Equation (1) described above, and stores the target energization time period T2$n$ in the storage unit 116.

Next, the motor drive control device 10 measures a period of the two-phase excitation based on the target energization time period T2$n$ calculated in step S9 (step S10). For example, the two-phase excitation period clocking unit 115 reads out the target energization time period T2$n$ from the storage unit 116 according to an instruction to start the measurement from the two-phase excitation period calculation unit 114, sets the target energization time period T2$n$ in the timer of the two-phase excitation period clocking unit 115, and starts clocking.

Note that the respective processes in steps S8 to S10 are not limited to processes performed in the order described above, and may be simultaneously performed.

Next, the motor drive control device 10 determines whether or not the target energization time period T2$n$ elapses after starting the two-phase excitation (step S11). When the target energization time period T2$n$ does not elapse (step S11: NO), the motor drive control device 10 continues to measure the period of the two-phase excitation.

On the other hand, when the target energization time period T2$n$ elapses (step S11: YES), the motor drive control device 10 stops measuring the period of the two-phase excitation (step S12). Specifically, when detecting that the measurement time reaches the target energization time period T2$n$, the two-phase excitation period clocking unit 115 stops clocking the period of the two-phase excitation and outputs a signal indicating the end of the two-phase excitation.

Thereafter, the motor drive control device 10 returns to step S2, and repeatedly performs the processing of steps S2 to S12 described above until an instruction to stop the two-phase stepping motor 20 is input from a host device or the like, so that the two-phase stepping motor 20 is driven with the excitation alternately switched between the one-phase excitation and the two-phase excitation.

As described above, in the motor drive control device 10 according to the present embodiment, it is possible to set an energization angle θ indicating a magnitude of an electric angle for continuously energizing the coil 21 of one phase of the two-phase stepping motor 20 in one direction. When performing the energization control of the two-phase stepping motor 20 by the one-two-phase excitation system, the motor drive control device 10 determines a period for performing the one-phase excitation based on a back electromotive voltage generated in the non-excited coil 21 in the one-phase excitation, and determines a period for performing the two-phase excitation based on an elapsed time per unit angle while the two-phase stepping motor 20 is being excited and the set energization angle θ.

In the conventional one-two-phase excitation system, the energization angle θ is fixed to 135°, and a magnitude of an electric angle corresponding to a period for each of the one-phase excitation and the two-phase excitation is 45°. In contrast, in the motor drive control device 10 according to the present embodiment, the energization angle θ can be set to a desired value within a range of, for example, 90°≤θ≤135°.

This allows an appropriate energization angle θ to be selected according to an inductance of the coil 21 of the two-phase stepping motor 20, a magnitude of a load, or the like so that a zero crossing point of a back electromotive voltage can be detected within the period of the one-phase excitation. For example, as described above, when the energization angle θ=120° is set, the electric angle corresponding to the period of the one-phase excitation is 60°, and thus the period of the one-phase excitation can be increased by an electric angle of 15° (=60°−45°) as compared to a case of fixing the energization angle θ to 135° as in the conventional case, so that a zero crossing point of a back electromotive voltage can be detected more easily.

Thus, the motor drive control device 10 according to the present embodiment can achieve stable energization switching by the one-two-phase excitation system of the two-phase stepping motor 20.

Further, in the motor drive control device 10 according to the present embodiment, the control unit 11 generates the control signal Sd so as to switch the excitation state of the two-phase stepping motor 20 from the one-phase excitation to the two-phase excitation according to a detection result of a zero crossing point of a back electromotive voltage generated in the non-excited coil 21 in a period of the one-phase excitation, determines the target energization time period T2$n$ based on an elapsed time per unit angle and the energization angle θ, and generates the control signal Sd so as to switch the excitation state of the two-phase stepping motor 20 from the two-phase excitation to the one-phase excitation when the target energization time period T2$n$ elapses after the start of the two-phase excitation.

This makes it possible to drive the two-phase stepping motor 20 so as to follow fluctuation in load of the two-phase stepping motor 20 in the period of the one-phase excitation.

Additionally, the period of the two-phase excitation is determined based on the elapsed time per unit angle while the two-phase stepping motor 20 is being excited and the energization angle θ, and thus, the two-phase stepping motor 20 can be driven so as to follow fluctuation in load also in the period of the two-phase excitation. That is, the motor drive control device 10 can achieve control for changing a rotational speed of the two-phase stepping motor 20 so that an appropriate torque according to the load of the two-phase stepping motor 20 is generated.

Additionally, in the motor drive control device 10, the control unit 11 measures the period T1$n$ of the one-phase excitation, and the elapsed time per unit angle is a value obtained by dividing the measurement value of the period T1$n$ of the one-phase excitation by a magnitude of an electric angle corresponding to the period T1$n$ of the one-phase excitation. More specifically, the control unit 11 calculates the target energization time period T2$n$ of the two-phase excitation based on Equation (1) described above.

This makes it possible to calculate the elapsed time per unit angle according to a rotational speed of the rotor of the two-phase stepping motor 20 in an actual period of the one-phase excitation, and thus, an appropriate period of the two-phase excitation according to the load state (rotational speed) of the two-phase stepping motor 20 can be set, and more stable energization switching can be achieved.

In addition, in the motor drive control device 10, the control unit 11 may measure a time period between zero crossing points of a back electromotive voltage instead of measuring the period T1$n$ of the one-phase excitation, and the elapsed time per unit angle may be a value obtained by dividing the measurement value of the time period between the zero crossing points by a magnitude of an electric angle between the zero crossing points. That is, the control unit 11 may calculate the target energization time period T2$n$ of the two-phase excitation based on Equation (3) described above.

This makes it possible to set an appropriate period of the two-phase excitation according to an actual load state of the two-phase stepping motor 20, as with the case of measuring the period T1$n$ of the one-phase excitation to calculate the elapsed time per unit angle, so that more stable energization switching can be achieved.

Additionally, in the motor drive control device 10, the control unit 11 may measure a period of the one-phase excitation performed immediately before the two-phase excitation, and calculate the target energization time period T2$n$ of the two-phase excitation by using the measured period as a measurement value of the period of the one-phase excitation. In this way, the period of the two-phase excitation can be caused to rapidly follow the fluctuation in load of the two-phase stepping motor 20.

Alternatively, in the motor drive control device 10, the control unit 11 may measure every period of a plurality of periods of the one-phase excitation performed before the two-phase excitation, and then, may use an average value of the measured plurality of periods as a measurement value of the period of the one-phase excitation to calculate the target energization time period T2$n$ of the two-phase excitation. In this way, the period of the two-phase excitation can be caused to gradually follow the fluctuation in load of the two-phase stepping motor 20.

Expansion of Embodiment

The invention conceived by the present inventors has been specifically described above based on the embodiments. However, the present invention is not limited to the embodiments, and of course, various modifications can be made without departing from the gist of the present invention.

For example, in the embodiment described above, a case of the two-phase stepping motor 20 including the rotor having two poles has been exemplified, but the number of poles of the rotor is not particularly limited.

The motor unit 1 according to the embodiments described above is not limited to have the configuration disclosed in FIG. 1. For example, the drive unit 12 may include other circuits such as a current detection circuit for detecting coil currents of the coils 21A and 21B, in addition to the motor drive unit 121 described above.

In addition, the flowcharts described above are examples for the purpose of explaining operations, and the embodiments are not limited to these flowcharts. That is, the steps illustrated in each drawing of the flowcharts are specific examples, and the embodiments are not limited to this procedure. For example, the order of processes may be partially changed, another process may be inserted between individual processes, or part of the processes may be performed in parallel.

REFERENCE SIGNS LIST

1 . . . Motor unit
10 . . . Motor drive control device
11 . . . Control unit
12 . . . Drive unit
20 . . . Two-phase stepping motor
21 . . . Coil
21A . . . A-phase coil
21B . . . B-phase coil
22 . . . Rotor
22N . . . N pole
22S . . . S pole
111 . . . Back electromotive voltage monitoring unit
112 . . . Zero crossing point detection unit
113 . . . One-phase excitation period clocking unit
114 . . . Two-phase excitation period calculation unit
115 . . . Two-phase excitation period clocking unit
116 . . . Storage unit
117 . . . Control signal generation unit
121 . . . Motor drive unit
Sd . . . Control signal
Sz . . . Detection signal
T1n . . . Period of one-phase excitation
T2n . . . Target energization time period (period of two-phase excitation)
AP . . . Terminal at the positive electrode side of the A-phase coil
AN . . . Terminal at the negative electrode side of the A-phase coil
BP . . . Terminal at the positive electrode side of the B-phase coil
BN . . . Terminal at the negative electrode side of the B-phase coil

The invention claimed is:

1. A motor drive control device comprising:
a control unit configured to generate a control signal for controlling driving of a two-phase stepping motor such that one-phase excitation of exciting, of coils of two phases of the two-phase stepping motor, a coil for one phase, and two-phase excitation of exciting, of the coils of two phases, the coils for two phases are alternately repeated; and
a drive unit configured to drive the coils of two phases based on the control signal, wherein
an energization angle representing a magnitude of an electric angle for continuously energizing the coil of one phase in one direction is set in the control unit, and
the control unit determines a period for performing the one-phase excitation based on a back electromotive voltage generated in the coil non-excited in the one-phase excitation, and determines a period for performing the two-phase excitation based on an elapsed time per unit angle while the two-phase stepping motor is being excited and the energization angle.

2. The motor drive control device according to claim 1, wherein the control unit generates the control signal such that an excitation state of the two-phase stepping motor is switched from the one-phase excitation to the two-phase excitation according to a detection result of a zero crossing point of the back electromotive voltage generated in the coil non-excited in the period of the one-phase excitation, and
the control unit determines a target energization time period based on the elapsed time per unit angle and the energization angle, and generates the control signal such that the excitation state of the two-phase stepping motor is switched from the two-phase excitation to the one-phase excitation when the target energization time period elapses after start of the two-phase excitation.

3. The motor drive control device according to claim 2, wherein
the control unit measures the period of the one-phase excitation, and
the elapsed time per unit angle is a value obtained by dividing a measurement value of the period of the one-phase excitation by a magnitude of an electric angle corresponding to the period of the one-phase excitation.

4. The motor drive control device according to claim 3, wherein
when the measurement value of the period of the one-phase excitation is $T1n$, the energization angle is $\theta$, and the target energization time period is $T2n$, the target energization time period is calculated based on following Equation (A):

[Equation 1]

$$T2n = \frac{T1n(\theta - 90°)}{180° - \theta}. \qquad (A)$$

5. The motor drive control device according to claim 3 or 4, wherein
the control unit measures the period of the one-phase excitation performed immediately before the two-phase excitation, and uses the measured period as the measurement value of the period of the one-phase excitation.

6. The motor drive control device according to claim 3 or 4, wherein the control unit measures every period of a plurality of the periods of the one-phase excitation performed before the two-phase excitation, and uses an average value of the measured plurality of the periods as the measurement value of the period of the one-phase excitation.

7. The motor drive control device according to claim 2, wherein the control unit measures a time period between zero crossing points of the back electromotive voltage, and the elapsed time per unit angle is a value obtained by dividing a measurement value of the time period between the zero crossing points by a magnitude of an electric angle between the zero crossing points.

8. The motor drive control device according to claim 7, wherein when the measurement value of the time period between the zero crossing points of the back electromotive voltage is Tz, the measured magnitude of the electric angle between the zero crossing points is $\alpha$, the energization angle is $\theta$, and the target energization time period is T2$n$, the control unit calculates the target energization time period based on following Equation (B):

[Equation 2]

$$T2n = \frac{Tz(\theta - 90°)}{\alpha}. \quad (B)$$

9. The motor drive control device according to any one of claims 1 to 8, wherein
the energization angle is a value equal to or larger than 90° and equal to or smaller than 135°.

10. A motor unit comprising:
the motor drive control device according to any one of claims 1 to 9; and
the two-phase stepping motor.

11. A motor drive control method for controlling driving of a two-phase stepping motor by a motor drive control device, the motor drive control method comprising:
a first step of generating, by the motor drive control device, a control signal for controlling driving of the two-phase stepping motor such that one-phase excitation of exciting, of coils of two phases of the two-phase stepping motor, a coil for one phase, and two-phase excitation of exciting, of the coils of two phases, the coils for two phases are alternately repeated; and
a second step of driving, by the motor drive control device, the coils of two phases based on the control signal, wherein
an energization angle representing a magnitude of an electric angle for continuously energizing the coil of one phase in one direction is set in the motor drive control device, and
the first step includes
a third step of determining a period for performing the one-phase excitation based on a back electromotive voltage generated in the coil non-excited in the one-phase excitation, and
a fourth step of determining a period for performing the two-phase excitation based on an elapsed time per unit angle while the two-phase stepping motor is being excited and the energization angle.

* * * * *